US005638132A

United States Patent [19]

Hokari et al.

[11] Patent Number: 5,638,132
[45] Date of Patent: Jun. 10, 1997

[54] IMAGE SENSING AND DISPLAY SYSTEM AND IMAGE PICK UP AND DISPLAY SYSTEM

[75] Inventors: Yasuaki Hokari; Akiyoshi Kohno, both of Tokyo, Japan

[73] Assignee: NEC Corporation, Tokyo, Japan

[21] Appl. No.: 354,795

[22] Filed: Dec. 12, 1994

[30] Foreign Application Priority Data

Dec. 10, 1993 [JP] Japan .................................. 5-340979

[51] Int. Cl.⁶ ............................................. H04N 5/46
[52] U.S. Cl. ...................... 348/556; 348/558; 348/312
[58] Field of Search ................... 348/460, 474, 348/554, 555, 556, 543, 704, 302, 558, 333; H04N 5/46, 3/227

[56] References Cited

U.S. PATENT DOCUMENTS

| | | | |
|---|---|---|---|
| 3,654,386 | 4/1972 | Baum | 348/704 |
| 3,787,619 | 1/1974 | Wolff | 348/589 |
| 4,028,726 | 6/1977 | Argy | 348/704 |
| 4,385,324 | 5/1983 | Shidda et al. | 348/704 |
| 4,394,690 | 7/1983 | Kobayashi | 348/556 |
| 4,556,906 | 12/1985 | Dischert et al. | |
| 4,763,194 | 8/1988 | Osman | 348/704 |
| 4,864,405 | 9/1989 | Chambers | 348/556 |
| 5,138,449 | 8/1992 | Kerpchar | 348/458 |
| 5,301,025 | 4/1994 | Hatano et al. | 348/704 |

FOREIGN PATENT DOCUMENTS

| | | |
|---|---|---|
| 0 219 638 | 4/1987 | European Pat. Off. . |
| 0 402 992 | 12/1990 | European Pat. Off. . |
| 0 533 092 | 3/1993 | European Pat. Off. . |
| 0559478 | 9/1993 | European Pat. Off. . |
| 2049374 | 12/1980 | United Kingdom . |

OTHER PUBLICATIONS

D. Nichols et al., "Single–Chip Color HDTV Image Sensor with Two Polysilicon Levels and with $WSi_x$ Lightshield Used for Strapping Vertical Gates", IEEE, 1992, pp. 101–104.

S. Manabe et al., "A 2–Million Pixel CCD Imager Overlaid with an Amorphous Silicon Photoconversion Layer", Session III: CCDs and Sensors, IEEE, 1989.

*Primary Examiner*—Victor R. Kostak
*Attorney, Agent, or Firm*—Young & Thompson

[57] ABSTRACT

An image pick up and displaying system comprises an image pick up device being provided with a signal superimposing unit for superimposing a recognition signal at a predetermined portion on any of synchronous pulse signals, except for any image signals, the recognition signal indicating any kind of the image pick up device; and a display device being connected to the image pick up device and further being provided with a signal detecting and sweeping control section for detecting any recognition signal to control a sweeping speed and a sweeping time of sweeping on a screen of the display device at least in any one of vertical and horizontal directions thereby the image is displayed on an entire of the screen without any distortion thereof.

8 Claims, 9 Drawing Sheets

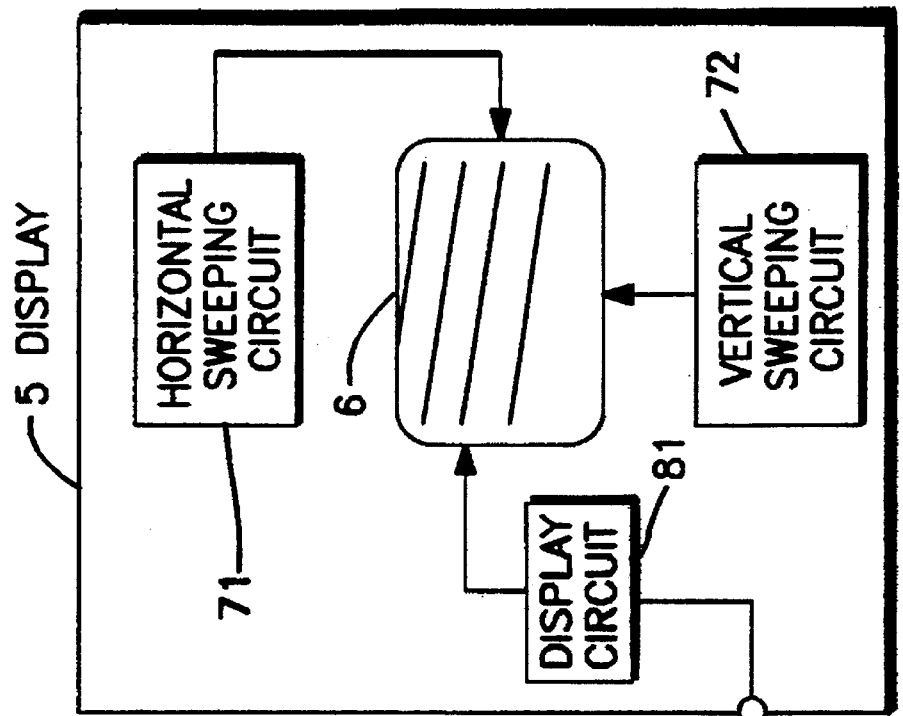
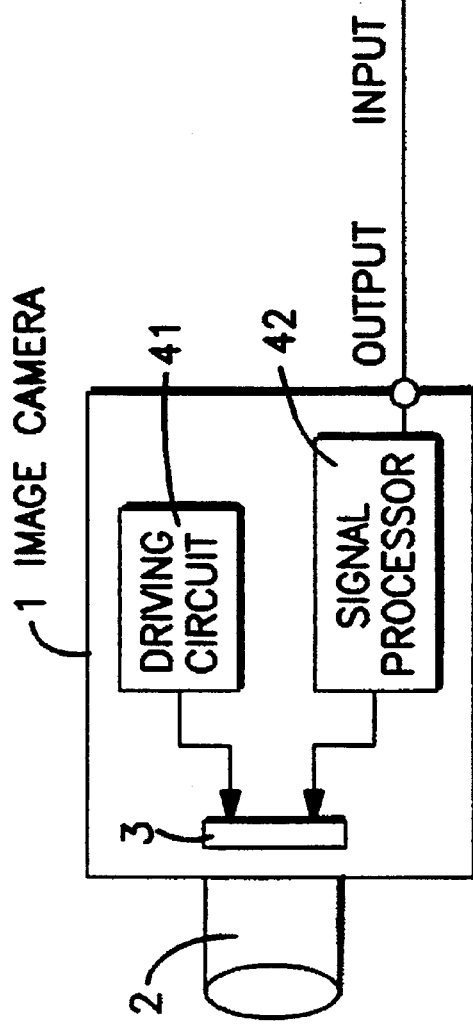
FIG. 2
PRIOR ART

FIG. 3
PRIOR ART
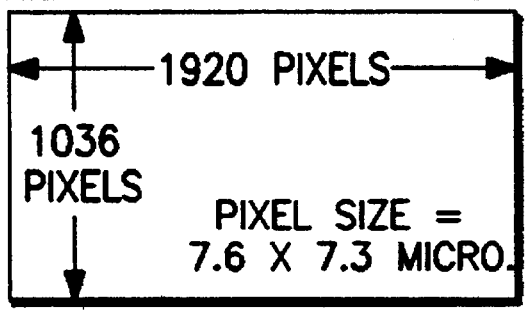
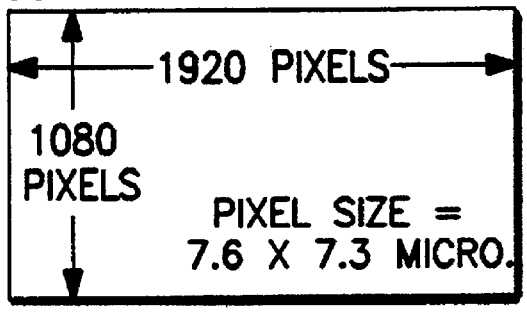
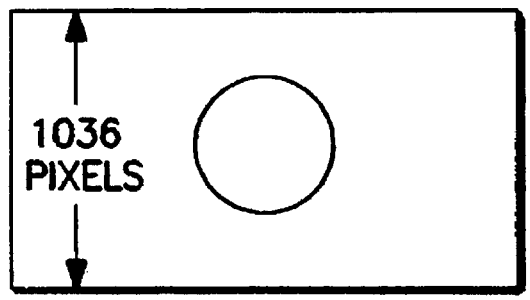
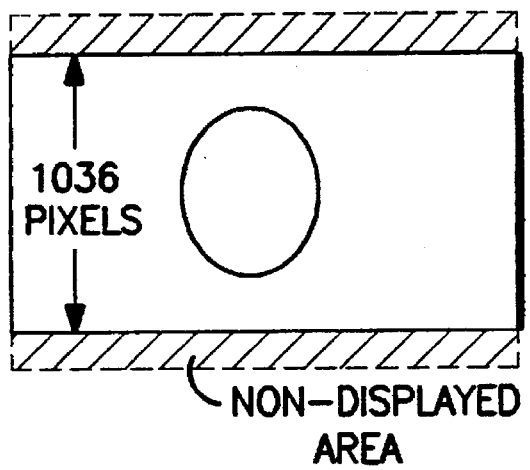
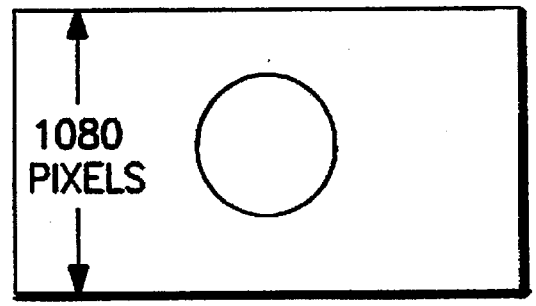

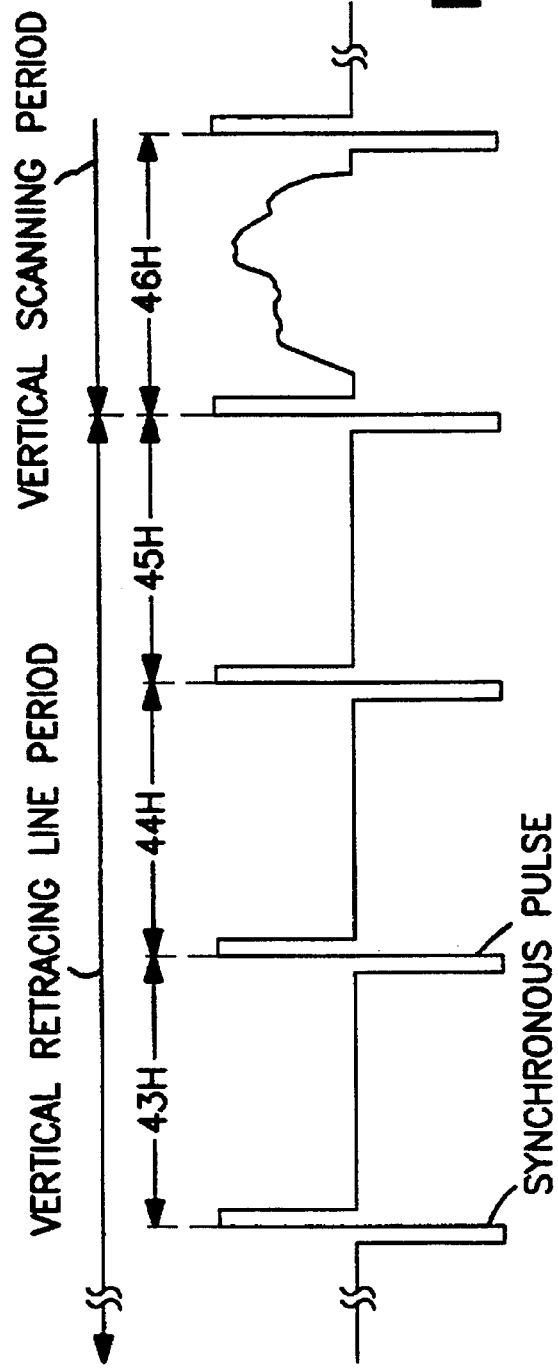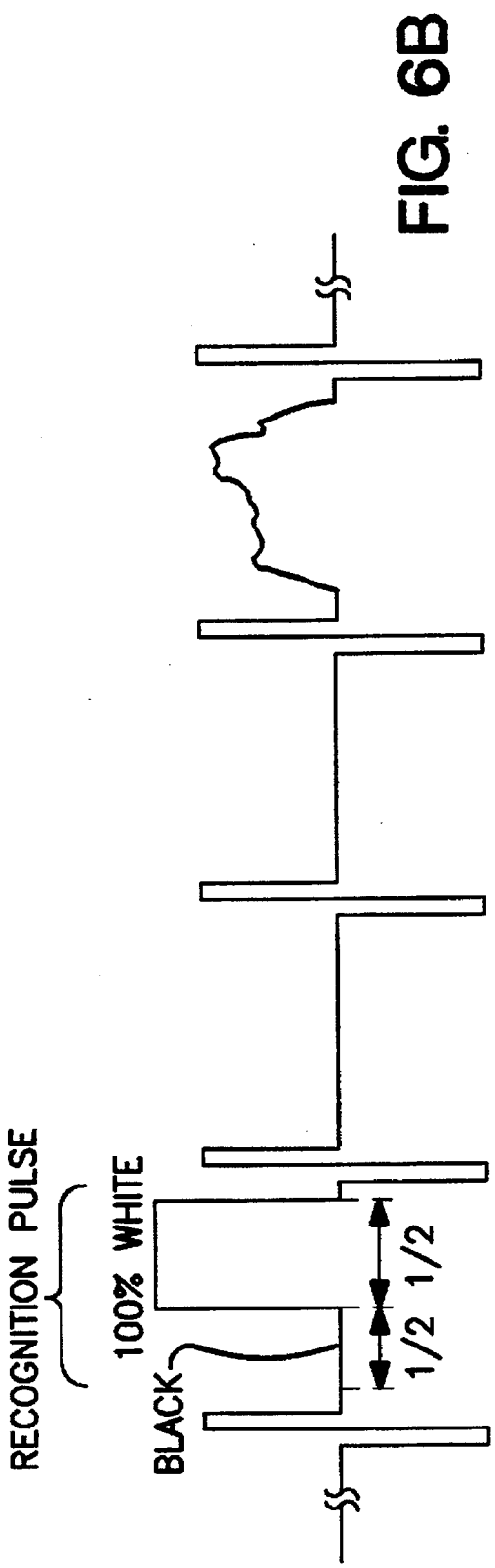

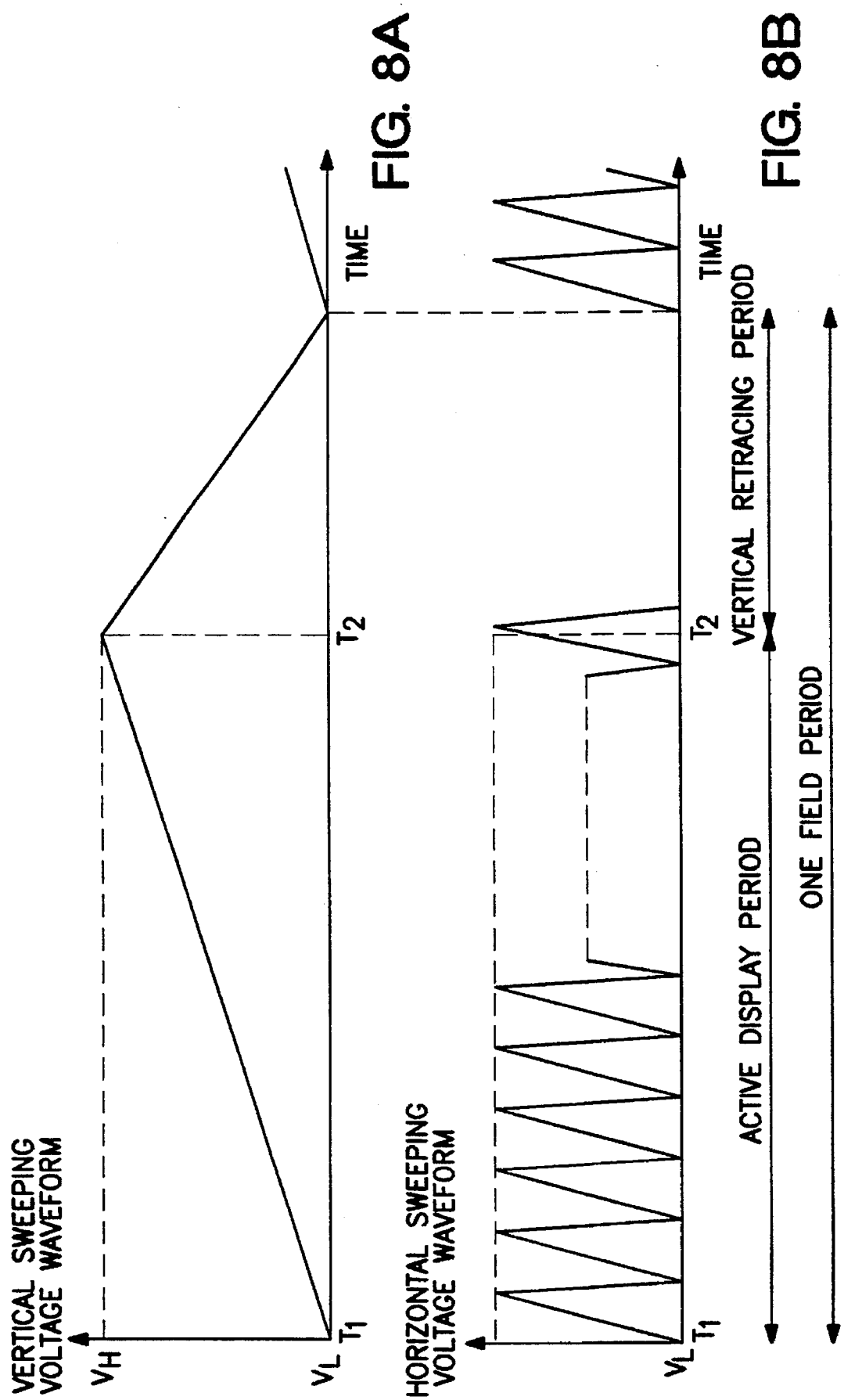

IMAGE SENSING AND DISPLAY SYSTEM AND IMAGE PICK UP AND DISPLAY SYSTEM

BACKGROUND OF THE INVENTION

The invention relates to an image sensor and display device, and more particularly to an image sensor and display device available to various size pixels of image sensors by compensation of image stress of image signals and subsequent display.

The image sensor has a plurality of unit pixels aligned in matrix within an active image area having a predetermined screen ratio. Each of the unit pixels performs a photoelectric conversion to generate image signals for sequential reading out operations and subsequent transfer thereof to the display device with a predetermined screen ratio. The screen ratio of a vertical length to a horizontal length of the active image area is 3:4 in the NTSC and PAL regulations, while in the high definition television system the screen ratio is 9:16. Namely, the optical image informations are converted to the image signals by the image sensor with a predetermined vertical-to-horizontal ratio of the active image area on which the pixels are aligned in matrix. The image signals are transferred to the display device for display on various sizes of the regulated screens as described above.

In the high definition television system, the display screen comprises an active image area having a vertical-to-horizontal ratio of 9:16 and having scanning line numbers of 1036 in which the scanning lines run in the horizontal direction as illustrated in FIG. 1. The one time scanning on all the scanning lines are carried out in a time of 1/30 seconds for the two-dimensional display. The screen comprises an interlace scanning of A and B fields. The active image are defined by a vertical scanning period and a horizontal scanning period. Inactive area outside the active image area but on the screen comprises a L-shaped area defined by a vertical retrace line period of 89 scanning lines and a horizontal retrace line period as illustrated in FIG. 1. For example, the active image area has a vertical size of 7.9 mm and a horizontal size of 14.0 mm for the alignment of the plurality of unit pixels. In use of the solid state image sensors, 2,000,000 pixels are aligned in such a matrix that 1036 pixels are aligned in the vertical direction and 1920 pixels are aligned in the horizontal direction wherein each pixel has a size of 7.6×7.3 micrometers. In case of 1,300,000 pixels being aligned, 1035 pixels are aligned in the vertical direction and 1258 pixels are aligned in the horizontal direction wherein each pixel has a size of 7.61×13.56 micrometers. Under the high definition television system, each pixel is rectangular-shaped, but not square-shaped. Similarly, under the NTSC or PAL regulation, high definition television system, each pixel is rectangular-shaped, but not square-shaped. In case of a lens format of ½ inches, 250,000 pixels, 330,000 pixels and 380,000 pixels are used wherein unit pixels have the same vertical size but various horizontal sizes to improve a horizontal resolution. Namely, under the conventional image sensor, it is not necessary that the unit pixel is square-shaped. As a large number of the pixels, at a high frequency, the reading out operation for the image signals from the image sensors is carried out. In the solid state image sensor according to the high definition television regulation, 2,000,000 pixels requires 4.25 MHz and 1,300,000 pixels requires 48.6 MHz.

In the high definition television regulation, a single scanning line on the screen is continued to be scanned for 29.6 microseconds. The active image area on the display screen includes 1035 or 1036 scanning lines. The image in the active image area of the solid state image sensor is displayed without any lack of the image. A variation of the frequency for the reading put operation may merely be represented as a variation of the horizontal resolution on the screen.

FIG. 2 illustrates configurations of an image camera 1 and a display device 5. The image camera 1 is provided with a camera lens 2. The image camera 1 includes a solid state image sensor 3, a driving circuit 41 being connected to the solid state image sensor 3 for driving the solid state image sensor 3 and an image signal processor 42 being connected to the solid state image sensor 3 for processing the image signals into which the optical images are converted by the solid state image sensor 3. The image signal processed by the image signal processor is outputted from an output terminal to be inputted into an input terminal of the display device 5. The display device 5 includes a screen section 6 with a cathode ray tube, a horizontal scanning circuit for permitting a horizontal scanning of electron beam on the screen section and a vertical scanning circuit for permitting a vertical scanning of electron beam on the screen section as well as an image signal display circuit for permitting an image signal display on the screen.

In the image camera 1, for every 1/30 seconds image signals corresponding to 1125 scanning times on the screen or 1045 to 1036 scanning lines on the active image area are read out by the solid state image sensor 3 in cooperation with the driving circuit 41 for processing of the image signals and subsequent output from the output terminal of the image camera 1. Thereafter, the image signals are inputted into the input terminal of the display device 5 to be supplied through the display circuit 81 to the screen on which all image informations picked up by the active image area of the solid state image sensor 3 are surely displayed.

Recently, computers tend to process frequently image signals with use of image synthesis or special processing, for example, enlargement or reduction of an image and rotation or turning over of the image. Under this circumstances, the squared pixels involved in the image sensor are suitable.

In the field of printing industry, the enlargement and reduction of the image are used. An improvement in the resolution by the interpolation between the pixels in the digital processing and a color tone compensation are also required. In view of the above, the squared pixels of the solid state image sensor are suitable. In this fields, a high definition image is essential. At present, a one dimensional high definition image input scanner has been realized.

As a two dimensional high definition scanner has been realized for a high definition television system only in which each pixels is rectangular-shaped but not square-shaped. The two dimensional high definition image input device with the squared pixels are expensive due to less demand. By contrast, a large number of the image sensors for the high definition television system are required thereby a cost of each of the image sensor may be reduced. For that reason, it is required to develop an image sensor being available for both the high definition television system and the computers. This further permit peripheral devices to be used commonly. Furthermore, it is permitted that any software developed for the high definition television system may be available to the computer and printing fields.

In the view point of common use of the image sensor in the high definition television and the computer, it was proposed that the high definition television system image sensor with the rectangular-shaped pixels picks up the image for computer processing. In this case, the image signals are required to be converted into analog signals for sampling at the predetermined frequency and subsequent conversion of digital signals for the square pixels. This analog to digital signal conversion may result in a deterioration of signal-to-noise ratio. Beat with the sampling frequency may permit a periodic noise generation. An expensive high speed analog-to-digital converter is required thereby resulting in an increase of the cost of the device.

Other two ways were proposed in which the image is picked up by the image sensor with the squared pixels available for computers to be displayed on a screen of the high definition television system. A first way is to keep the number of scanning lines but vary the number of pixels aligned in the horizontal direction. In case of the solid state image sensor with 2,000,000 pixels in one inch formal, unit pixels are designed to have the squared definition of 7.3 micrometers and 7.3 micrometers while normally the vertical and horizontal sizes of the unit pixels are 7.6 micrometers and 7.3 micrometers respectively in use for the high definition television system. When the squared pixels are aligned in the active image area of the vertical to horizontal ratio of 9:16, then a reduced number of pixels may be permitted to be aligned within he active image area, thereby resulting in a lowering of the reading out frequency for the image signals.

To raise the reading out frequency, it is required to newly design the driving circuit and the image signal processor involved in the image sensor. This is not preferable in view of the high definition television regulation.

A second way is to design the squared unit pixels to have size of 7.3 micrometers×7.3 micrometers so that the number of the active squared pixels is increased from 1036 up to 1080. As illustrated in FIG. 3, 1080×1920 pixels are aligned in the active image area. Notwithstanding, the number of the pixels aligned in the horizontal direction is not changed. Hence, the reading out frequency for the image signal is the same as that of the 2,000,000 pixels.

In electing the second way, when displaying the image signals on the monitor screen with 1036 active scanning lines for the high definition television system. Then as illustrated in FIG. 3 the image displayed on the screen is extended by 45 in the vertical direction and further on the screen non-displaying areas including 44 scanning lines are present. Normally, acceptable image distortion is within 3% so that the image distortion may be compensated by 4% lowering of a triangle waveform voltage to be applied to a vertical deflecting yoke of the cathode ray tube.

Otherwise, a vertical sweeping time is compensated to be extended by 4% so that 1080 scanning lines may be displayed on the screen thereby as illustrated in FIG. 3, the image picked up by the image sensor with the square pixels may be completely displayed on the high definition television screen of 9:16 without any lack of the image or any image distortion. Notwithstanding, this way requires a judgment of whether the image signals are picked up by the rectangular-shaped pixels of the high definition television image sensor or by the squared pixels image sensor and subsequent switching operation so the vertical sweeping voltage and the sweeping time. Actually, it is difficult to judge whether the image displayed on the screen has the 4% image distortion. In the above viewpoints, it has been required to develop a novel display device.

SUMMARY OF THE INVENTION

It is an object of the present invention to provide a novel image sensing and displaying system being available for not only computer and printing systems but also high definition television system to be free from any problem as described above.

The above and other objects, features and advantages of the present invention will be apparent from the following descriptions.

The invention provides a novel image camera including an image sensor for conversion into image signals and a processor being connected to the image sensor for fetching the image signals and subsequent processing the image signals to superimpose recognition signals, that indicate a kind of the image sensors, on a part of a retrace line period of the image signals.

The invention also provides a novel display device including a monitor screen, a detector for detecting the recognition signals superimposed on the part of the retrace line period of the image signals and a control section for controlling vertical and horizontal sweeping speeds on a monitor screen of the display device.

The invention also provide a novel image sensing and displaying system including an image camera and a display device being connected to receive image signals and other informations from the image camera, wherein the camera includes an image sensor for conversion into image signals and a processor being connected to the image sensor for fetching the image signals and subsequent processing the image signals to superimpose recognition signals, that indicate a kind of the image sensors, on a part of a retrace line period of the image signals, and also wherein the display device includes a monitor screen, a detector for detecting the recognition signals superimposed on the part of the retrace line period of the image signals and a control section for controlling vertical and horizontal sweeping speeds on a monitor screen of the display device.

BRIEF DESCRIPTION OF THE DRAWINGS

Preferred embodiments of the present invention will hereinafter fully be described in detail with reference to the accompanying drawings.

FIG. 2 is a diagram illustrative of the conventional configurations of the image camera and the display device.

FIG. 3 is a view illustrative of various images displayed on screens with or without image distortion.

FIG. 6A and 6B are diagrams illustrative of superimposition of recognition signals on a part of a retrace line period in a first embodiment according to the present invention.

FIG. 8 shows wave forms of vertical and horizontal sweeping voltage signals applied to vertical and horizontal deflection coils, respectively, in the period of one field which corresponds to one screen.

DETAILED DESCRIPTION OF THE INVENTION

According to the present invention, a novel image sensing and displaying system includes an image camera and a display device being connected to receive image signals and other informations form the image camera. The camera includes an image sensor for conversion into image signals and a processor being connected to the image sensor for fetching the image signals and subsequent processing the image signals to superimpose recognition signals, that indicate a kind of the image sensors, on a part of a retrace line period of the image signals. The display device includes a monitor screen, a detector for detecting the recognition signals superimposed on the part of the retrace line period of the image signals and a control section for controlling vertical and horizontal sweeping speeds on a monitor screen of the display device.

According to the present invention, the image sensor may comprise 2,000,000 square pixels comprising solid state image sensors aligned in matrix on an active image area so that 1080 pixels are aligned in the vertical direction and 1920 pixels are aligned in the horizontal direction. The active image area has a vertical-to-horizontal size ratio of 9:16. The image sensor is driven at a reading out frequency of 74.25 MHz. The image camera is provided with a recognition pulse superimposition circuit so that an output signal has a vertical retrace line period which predetermined position is superimposed with a recognition pulse indicating that the image was picked up by a square pixel image camera.

The display device may be designed for a high definition television display and provided with a recognition pulse detection circuit and a sweeping control circuit. The recognition pulse detecting circuit may detect any recognition pulse signal so either that a vertical sweeping speed is reduced by 4% and that a sweeping time is extended by 4% to thereby permit 1080 active scanning lines to be displayed on the screen, resulting in distortion-free image being displayed on the screen.

Figure 4:
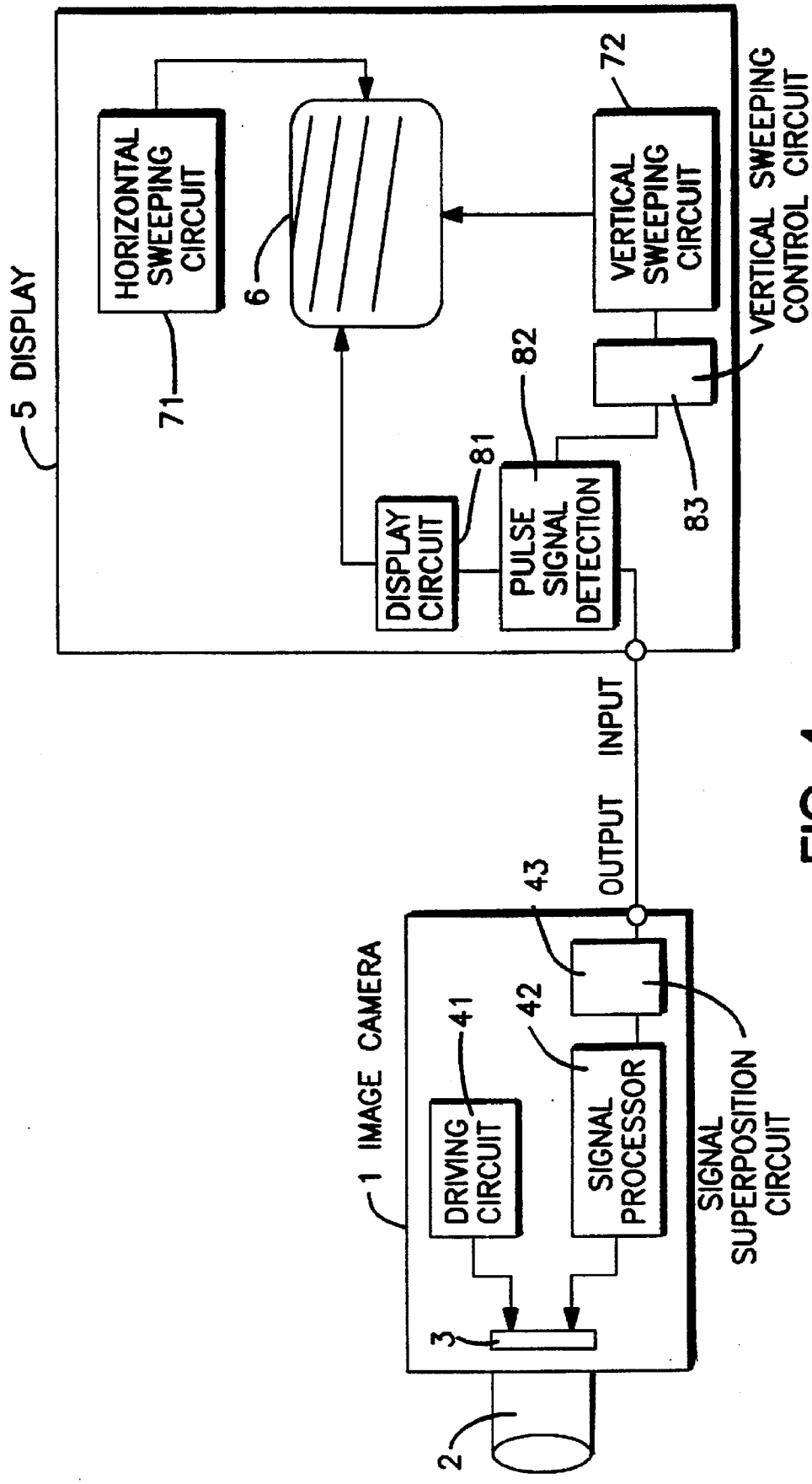
FIG. 4 is a diagram illustrative of a novel configuration of an image camera and a display device in a first embodiment according to the present invention.

A first embodiment according to the present invention will be described in detail with reference to FIG. 4 in which an image sensing and displaying system is provided.

The image sensing and displaying system comprises an image camera 1 and a display device 5. The image camera is provided with a camera lens 2. The image camera 1 includes a solid state image sensor 3, a driving circuit 41 being connected to the solid state image sensor 3 for driving the solid state image sensor 3, and image signal processing unit 42 being connected to the solid state image sensor 3 for receipt of the image signals from the solid state image sensor 3 and subsequent processing of the image signals and a recognition pulse signal superimposition circuit 43 for receipt of the image signal from the image signal processing unit 42 and subsequent superimposition of a recognition pulse signal on a predetermined position in a vertical retrace line period of the image signal. The recognition pulse signal is to indicate a kind of the image camera with specific pixels. In this embodiment, square pixels are used. The image signal superimposed with the recognition pulse signal is outputted from an output terminal of the image camera 1. The output terminal of the image camera 1 is connected to an input terminal of the display device 5 so that the input terminal may receive the image signals superimposed with the recognition signal.

The display device 5 has a screen section 6 comprising a cathode ray tube. The display device 5 includes a horizontal sweeping circuit 71 being connected to the screen section 6 with the cathode ray tube for conducting a sweeping of an electron beam in the horizontal direction on the cathode ray tube of the screen section 6. The display device 5 includes a vertical sweeping circuit 72 connected to the screen section 6 with the cathode ray tube for conducting a sweeping of an electron beam in the vertical direction on the cathode ray tube of the screen section 6. The display device 5 includes an image signal display circuit 81 connected to the screen section 6 with the cathode ray tube for permitting the image to be displayed on the screen 6. The display device 5 also includes a recognition pulse signal detecting circuit 82 connected to the input terminal for receipt of the image signals superimposed with the recognition pulse signal in order to detect the recognition pulse signal. The recognition pulse signal detecting circuit 82 is connected to the image signal display circuit 81 for transmitting the image signals without the detected recognition pulse signal into the image signal display circuit 81, which the recognition pulse signal detecting circuit 82 is further connected to a vertical sweeping control circuit 83 to supply the detected recognition pulse signal only to the vertical sweeping control circuit 83 connected to the vertical sweeping circuit 72 so that the vertical sweeping control circuit 83 controls, according to the recognition pulse signal, the sweeping speed and sweeping time in the vertical direction.

As described above, the image camera 1 of this embodiment according to the present invention has a structural difference from the prior art in providing the recognition pulse signal superimposition circuit 43. The display device 5 of this embodiment according to the present invention has a structural difference from the prior art in providing the recognition pulse signal detecting circuit 82 and the vertical sweeping control circuit 83.

Figure 5:
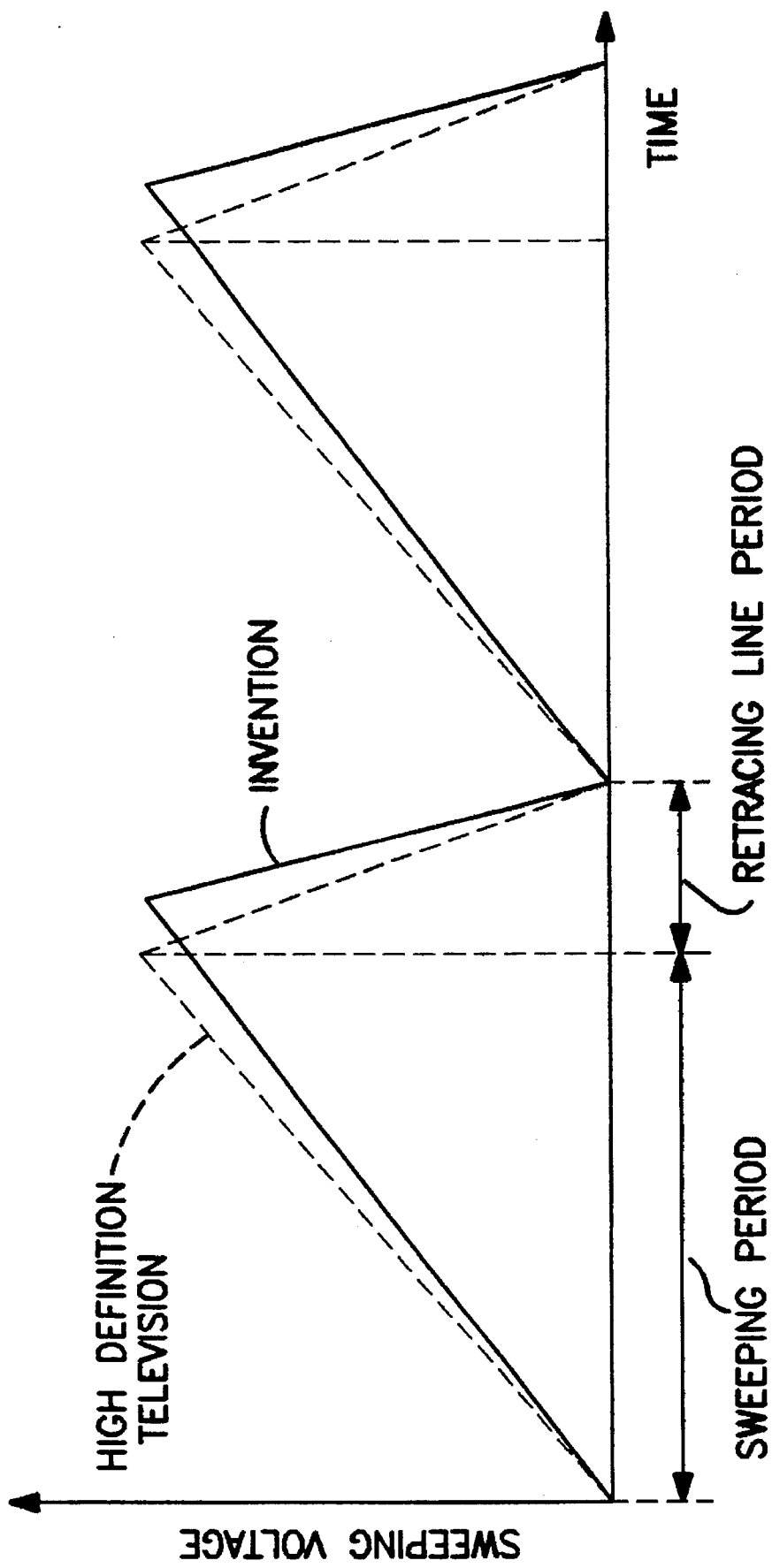
FIG. 5 is a diagram illustrative of vertical sweep waveforms used in a first embodiment according to the present invention.
Figure 7:
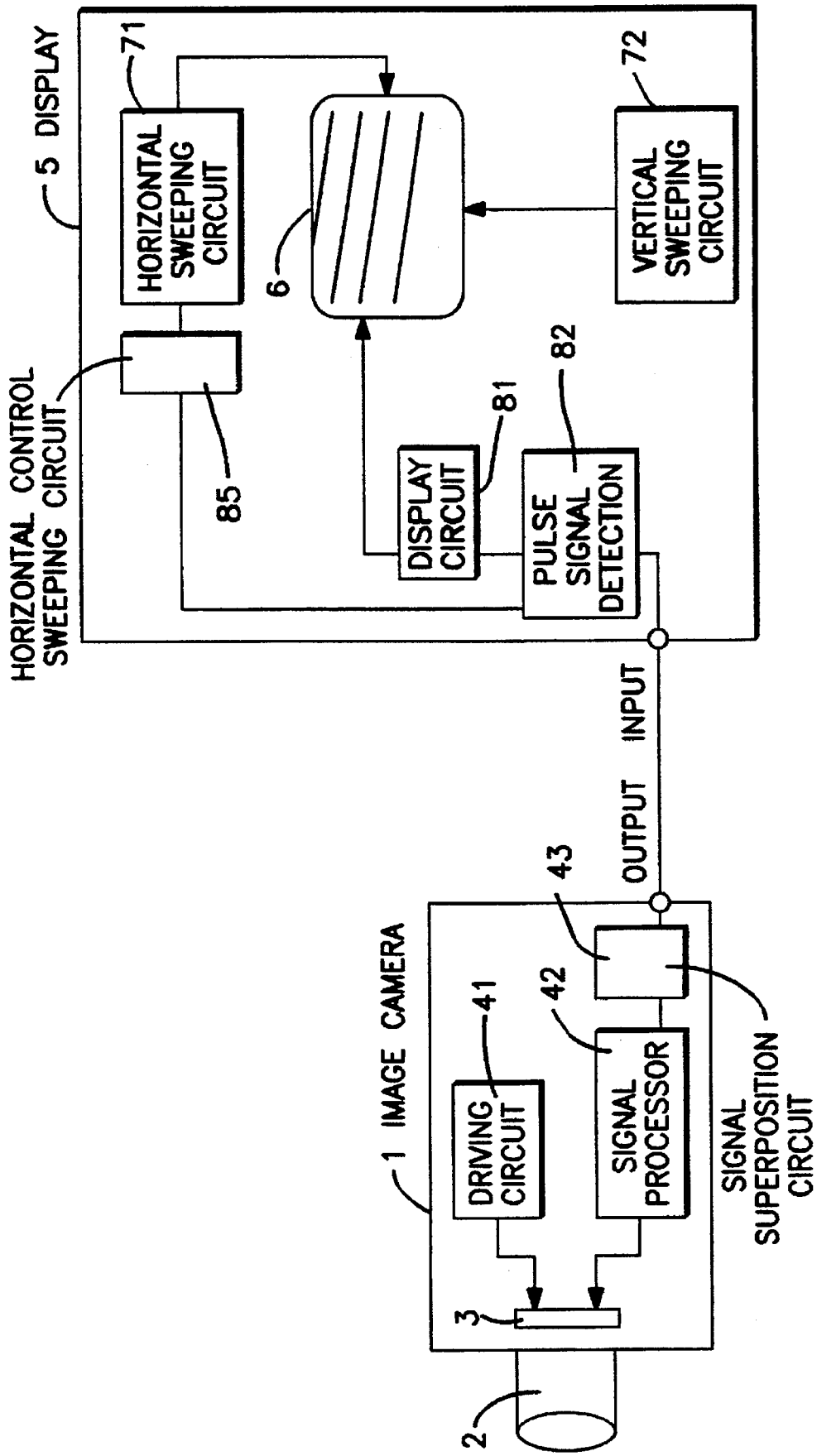
FIG. 7 is a diagram illustrative of a novel configuration of an image camera and display device in a second embodiment according to the present invention.

FIG. 5 illustrates vertical sweeping voltage waveforms of the invention and the normal high definition television system. The vertical sweeping voltage waveform of the invention has an extended sweeping period and a reduced retracing line period as compared to the normal high definition television regulation.

FIG. 6A and 6B illustrate pulse signal waveforms for the normal high definition television system and the novel system in the vertical retracing line period and in the vertical scanning period. In the normal high definition television regulation, the vertical retracing line period includes 45 scanning lines and 45 corresponding synchronous pulse signals. The image signals are superimposed on or after a forty sixth scanning line 46H in the vertical scanning period. The synchronous pulse signals are for counting of a timing for feeding the image signals but never include any image signal. As illustrated in FIG. 6B, the recognition pulse signal is superimposed on the synchronous pulse signal before the vertical scanning period. In this embodiment, the recognition pulse signal is superimposed on a forty third pulse 43H or on a third pulse before the vertical scanning period. Since any pulse signal includes no image signal, the superimposition of the recognition pulse signal on the pulse signal before the vertical scanning period does not affect the image signals in the vertical scanning period. It is available to superimpose the recognition pulse signal on a pulse signal in the vertical retracing line period before the vertical scanning period to make the image signals free from any affect by the superimposition of the recognition pulse signal that indicates a kind of the pixels involved in the image camera. The recognition pulse signal may comprise a low level corresponding to the black in a first half period of the forty third pulse 43H and high level corresponding to the white in a second half period of the forty third pulse 43H. Such a single pulse waveform is sufficient for constituting the recognition pulse signal that indicates a kind of the image camera.

As modifications for superimposition of the recognition pulse signal, it is available to superimpose the recognition pulse signals for every time periods, for example, at one second interval or five seconds interval. It is also available to superimpose the recognition signal on a horizontal retracing line period to avoid the scanning period including the image signals.

The recognition pulse signal detection circuit 82 detects any recognition signal on the forty third 43H. The recognition pulse signal indicates that the image camera includes the squared pixels as the solid state image sensors. When the recognition pulse signal detection circuit 82 detects no recognition pulse signal on the forty third pulse 43H in the vertical retrace line period, then the display of the image is carried out according to the normal high definition television regulation. By contrast, if the recognition pulse signal detection circuit 82 detects the recognition pulse signal on the forty third 43H in the vertical retrace line period, then the vertical sweep control circuit controls the vertical sweep circuit 72 so that the vertical sweeping speed is reduced by 4% and the vertical sweeping time is extended by 4% thereby the number of the active scanning lines is increased from 1036 to 1080, resulting in a perfection of the image display on an entire of the 9:16 ratio screen for the high definition television.

As compared to the high definition television system, the number of the displayed scanning lines is increased by 44. In the vertical retracing line period, 45 scanning lines are ensured to prevent any problem in displaying the image on the 9:16 high definition television screen.

Consequently, the novel system may render the solid state image sensor and the display device commonly usable or compatible between the computer systems and the high definition television systems.

A second embodiment according to the present invention will be described in detail with reference to FIG. 4 in which an image sensing and displaying system is provided.

The image sensing and displaying system comprises an image camera 1 and a display device 5. The image camera is provided with a camera 2. The image camera 1 includes a solid state image sensor 3, a driving circuit 41 being connected to the solid state image sensor 3 for driving the solid state image sensor 3, an image signal processing unit 42 being connected to the solid state image sensor 3 for receipt of the image signals from the solid state image sensor 3 and subsequent processing of the image signals and recognition pulse signal superimposition circuit 43 being connected to the image signal processing unit to the image signal processing unit 42 for receipt of the image signal from the image signal processing unit 42 and subsequent superimposition of an recognition pulse signal on a predetermined position in a horizontal retrace line period of the image signal. The recognition pulse signal is to indicate a kind of the camera with specific pixels. In this embodiment, square pixels are used. The image signal superimposed with the recognition pulse signal is outputted from an output terminal of the image camera 1. The output terminal of the image camera 1 is connected to an input terminal of the display device 5 so that the input terminal may receive the image signals superimposed with the recognition signal.

The display device 5 has a screen section 6 comprising a cathode ray tube. The display device 5 includes a horizontal sweeping circuit 71 being connected to the screen section 6 with the cathode ray tube for conducting a sweeping of an electron beam in the horizontal direction on the cathode ray tube of the screen section 6. The display device 5 includes a vertical sweeping circuit 72 connected to the screen section 6 with the cathode ray tube for conducting a sweeping of an electron beam in the vertical direction on the cathode ray tube of the screen section 6. The display device 5 includes an image signal display circuit 81 connected to the screen section 6 with the cathode ray tube for permitting the image to be displayed on the screen 6. The display device 5 also includes a recognition pulse signal detecting circuit 82 connected to the input terminal for receipt of the image signals superimposed with the recognition pulse signal in order to detect the recognition pulse signal. The recognition pulse signal detecting circuit 82 is connected to the image signal display circuit 81 for transmitting image signals without the detected recognition pulse signal into the image signal display circuit 81, which the recognition pulse signal detecting circuit 82 is further connected to a horizontal sweeping control circuit 85 to supply the detected recognition pulse signal only into the horizontal sweeping control circuit 85 being connected to the horizontal sweeping circuit 71 so that the horizontal sweeping control circuit 85 controls, according to the recognition pulse signal, a sweeping speed and a sweeping time in the horizontal direction.

As described above, the image camera 1 of this embodiment according to the present invention has a structural difference from the prior art in providing the recognition pulse signal superimposition circuit 43. The display device 5 of this embodiment according to the present invention has a structural difference from the prior art in providing the recognition pulse signal detecting circuit 82 and the horizontal sweeping control circuit 85.

The horizontal sweeping voltage waveform of the invention has an extended sweeping period and a reduced retracing line period as compared to the normal high definition television regulation.

The recognition pulse signal is superimposed on the synchronous pulse signal before the horizontal scanning period. In this embodiment, the recognition pulse signal is superimposed before the horizontal scanning period. Since any pulse signal includes no image signal, the superimposition of the recognition pulse signal on the pulse signal before the horizontal scanning period may provide no affect to the image signals in the horizontal scanning period. For that reason, it is available to superimpose the recognition pulse signal on a pulse signal in the horizontal retracing line period before the horizontal scanning period to make the image signal free from any affect by the superimposition of the recognition pulse signal that indicates a kind of the pixels involved in the image camera.

The recognition pulse signal detection circuit 82 detects any recognition signal indicating that the image camera 1 includes the squared pixels as the solid state image sensors. When the recognition pulse signal detection circuit 82 detects no recognition pulse signal on the horizontal retrace line period, then the display of the image is carried out according to the normal high definition television regulation. By contrast, if the recognition pulse signal detection circuit 82 detects the recognition pulse signal o the horizontal retrace line period, then the horizontal sweep control circuit controls the horizontal sweep circuit 72 so that the horizontal sweeping speed is reduced by 4% and the horizontal sweeping time is extended by 4% thereby the number of the active scanning lines is increased up to 1036, resulting a distortion-reduced image display on the screen.

Consequently, the novel system may render the solid state image sensor and the display device commonly usable or compatible between the computer systems and the high definition television system.

FIG. 8 shows wave forms of vertical and horizontal sweeping voltage signals applied to vertical and horizontal deflection coils, respectively, in the period of one field which corresponds to one screen. The vertical and horizontal sweeping voltage signals have a high level $V_H$ at a time $T_2$. The vertical sweeping voltage signal waveform has one triangle in one field so that the frequency of the vertical sweeping voltage signal corresponds to that one field period. The horizontal sweeping voltage signal waveform has many triangles in one field, so that the vertical sweeping signal has a high frequency. The number of scanning lines corresponds to the number of the triangles of the horizontal sweeping voltage signal waveform in one field. The active display period is terminated at the same time $T_2$. The remaining period in one field is the retracing period.

Figure 1:
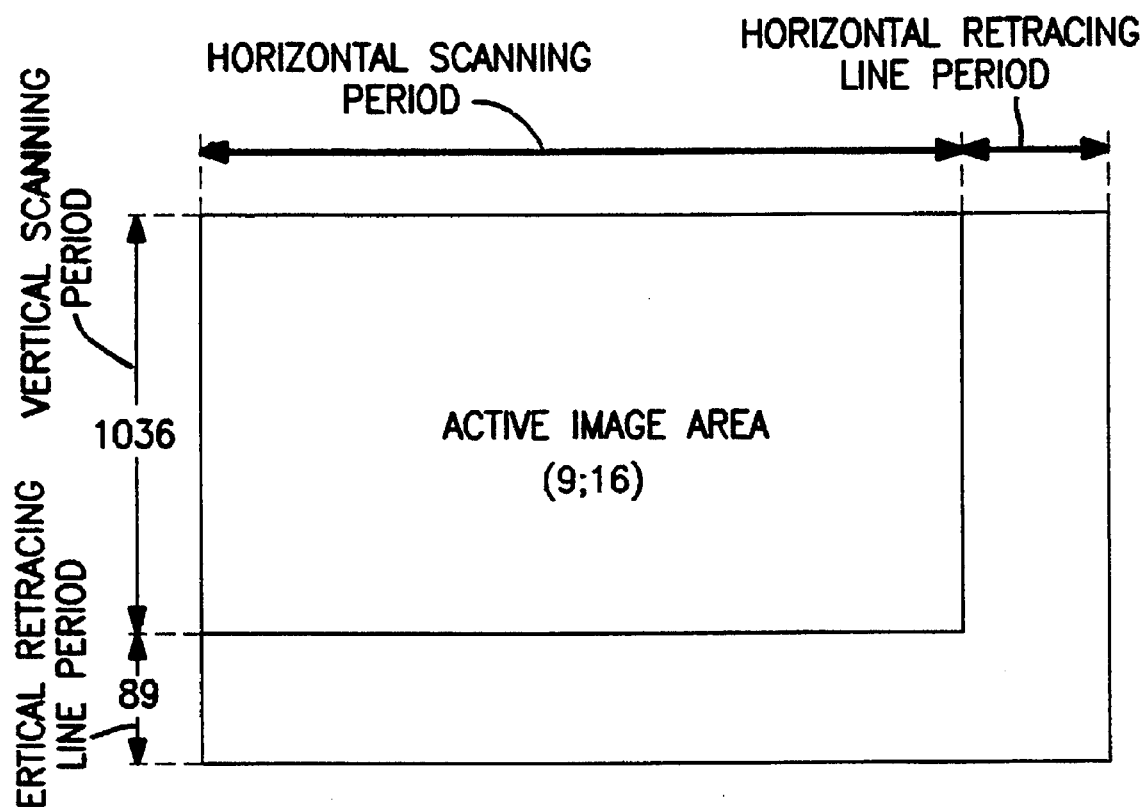
FIG. 1 is a view illustrative of the screen for the high definition television.
Figure 9:
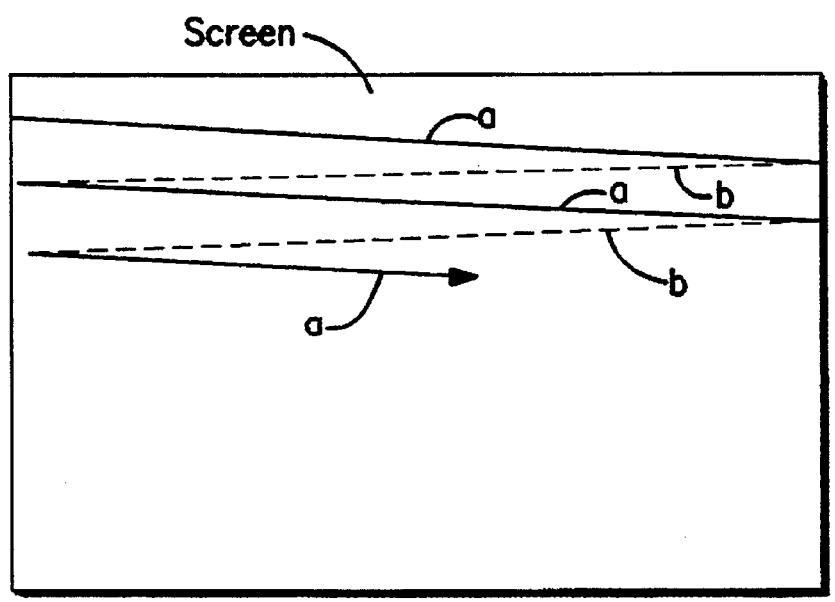
FIG. 9 shows the electron beam sweep illustrated by sloped linear lines that appears on the screen of the display if the vertical and the horizontal sweeping voltage signals of FIG. 8 are applied to the vertical and horizontal deflection coils, respectively.

If the above vertical and horizontal sweeping voltage signals are applied on the vertical and horizontal deflection coils respectively, then an electron beam sweep illustrated by sloped linear line "a" in FIG. 9 appears on the screen of the display. In the sweep of the vertical sweeping voltage from $V_L$ to $V_H$, the sweeping of the electron beam represented by the lines "a" extends from the top of the screen to the bottom thereof. During that time, the high frequency horizontal sweeping voltage signals are applied so that a two-dimensional image appears on the screen. Level broken lines "b" represent the locus of the horizontal sweeping in the retracing period. The locus of the horizontal sweeping is not displayed on the screen. It should be noted that if the vertical sweeping voltage is $V_L$ then the electron beam sweep is deflected toward the top of the screen. On the other hand, if the vertical sweeping voltage is $V_H$ then the electron beam sweep is deflected toward the bottom of the screen.

Figure 10A:
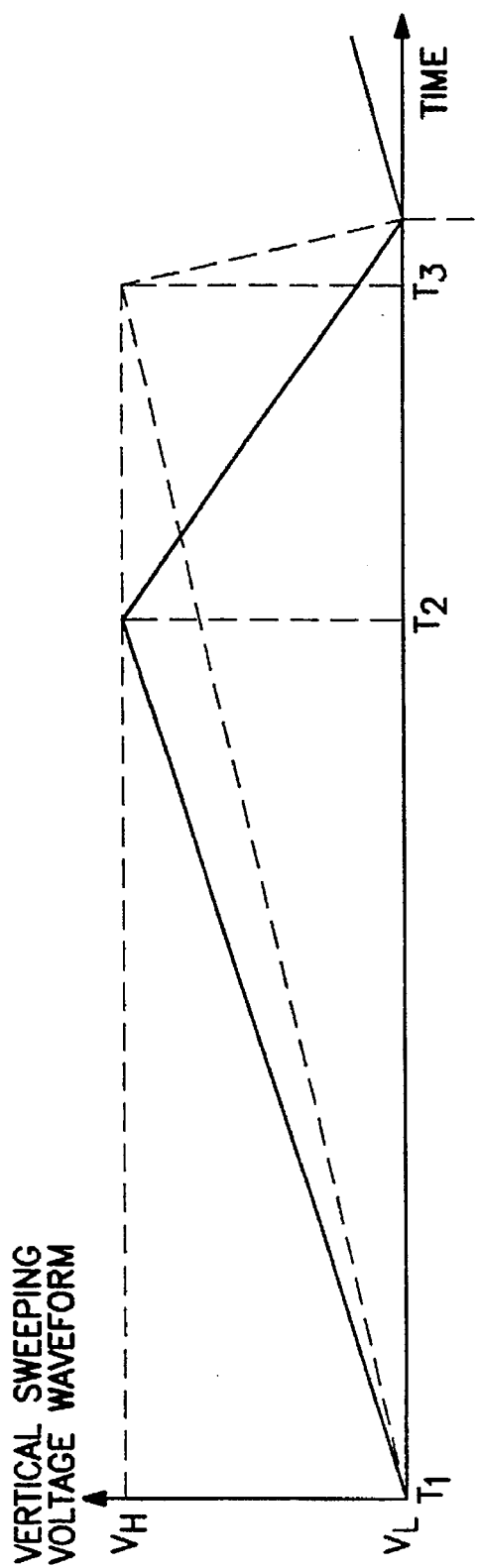
FIG. 10 is similar to FIG. 8 but shows the waveform of the vertical sweep voltage represented by the real line when changed so that the waveform of the vertical sweep voltage has a high level $V_H$ at a time $T_3$.
Figure 10B:
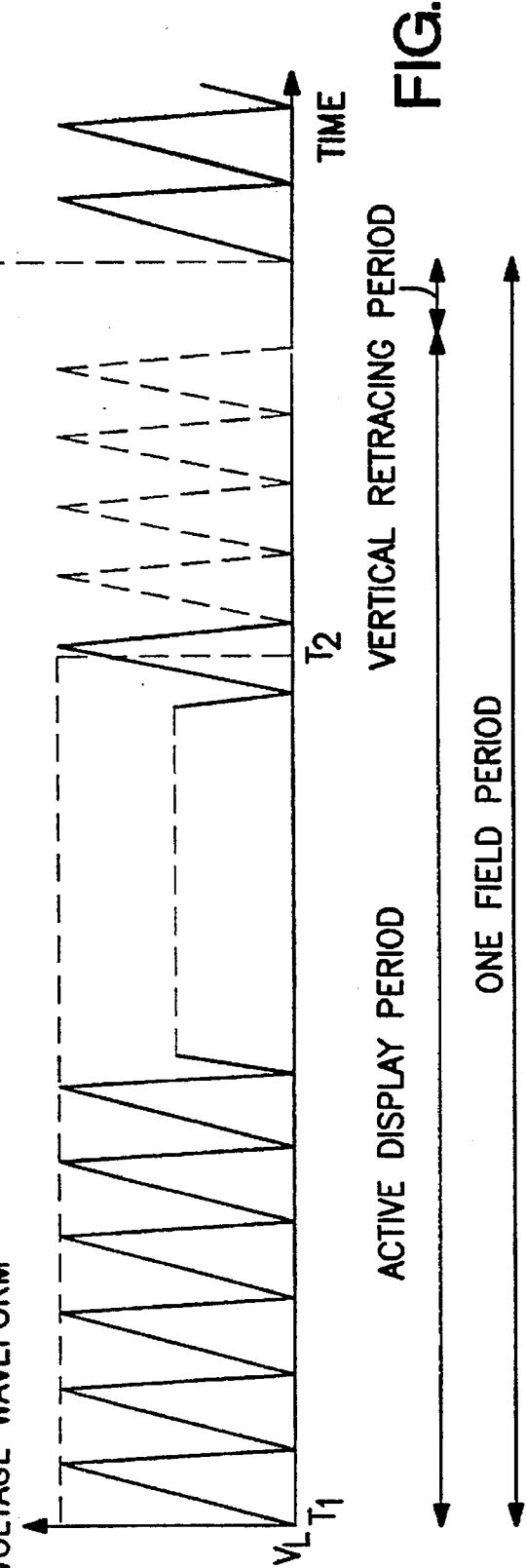

With reference to FIG. 10, the waveform of the vertical sweep voltage represented by the real line is changed so that the waveform of the vertical sweep voltage has the high level $V_H$ at a time $T_3$. The active display period becomes longer and is terminated at the $T_3$. The remaining period in one field is the retracing period. On the other hand, the frequency of the horizontal sweeping voltage signal waveform remains unchanged so that the number of the triangles of the horizontal sweeping voltage signal waveform in the active display period is increased by the number of triangles between $T_2$ and $T_3$ due to the increase of the active display period from $T_2$ to $T_3$. As described above, the number of the triangles of the horizontal sweeping voltage signal waveform corresponds to the number of scanning lines. As a result, the change in the waveform of the vertical sweeping voltage causes an increase in the number of the scanning lines.

Whereas modifications of the present invention will no doubt be apparent to a person having ordinary skill in the art, to which the invention pertains, is to be understood that the embodiments shown and described by way of the illustrations are by no means intended to be considered in a limiting sense. Accordingly, it is to be intended to cover by the claims all modifications of the present invention which fall within the spirit and scope of the invention.

What is claimed is:

1. An image sensing and displaying system comprising:
   an image camera being provided with a signal superimposing unit for superimposing a recognition signal at a predetermined portion on any of time periods, except for all scanning periods including all image signals, said recognition signal indicating any kind of said image camera; and
   a display device being connected to said image camera and further being provided with a signal detecting and sweeping control section for detecting any recognition signal to control a sweeping speed and a sweeping time of an electron beam sweeping on a screen of said display device at least in any one of vertical and horizontal directions thereby the image is displayed entirely on said screen without any distortion thereof, wherein said screen of said display device is for a high definition television system and said image camera further comprises a solid state image sensor from which said recognition signal indicating squared pixels is superimposed at a predetermined portion in a retracing line period before the scanning period including all image signals, and wherein said recognition signal is superimposed on a vertical retracing line period so that said signal detecting and sweeping control section may control a sweeping speed and a sweeping time in the vertical direction to reduce the sweeping speed and to extend the sweeping time.

2. An image pick up and displaying system comprising:
   an image pick up device being provided with a signal superimposing unit for superimposing a recognition signal at a predetermined portion on any of synchronous pulse signals, except for any image signals, said recognition signal indicating any kind of said image pick up device; and
   a display device being connected to said image pick up device and further being provided with a signal detecting and sweeping control section for detecting any recognition signal to control a sweeping speed and a sweeping time of sweeping on a screen of said display device at least in any one of vertical and horizontal directions thereby the image is displayed on an entire of said screen without any distortion thereof, wherein said screen of said display device is combined with a high definition television system and said image camera further comprises a solid state image sensor from which said recognition signal indicating squared pixels is superimposed at a predetermined portion in a retracing line period before the scanning period including all image signals, wherein said recognition signal is superimposed on a vertical retracing line period so that said signal detecting and sweeping control section may control a sweeping speed and a sweeping time in the vertical direction to reduce the sweeping speed and to extend the sweeping time.

3. The system as claimed in claim 2, wherein said display device comprises:
   a screen with a cathode ray tube;
   a vertical sweeping circuit being connected to said screen for conducting a sweeping in the vertical direction;
   a horizontal sweeping circuit being connected to said screen for conducting a sweeping in the horizontal direction;
   a signal detecting circuit being connected to an input terminal for receipt of any signals and subsequent detection of any recognition signal; and a vertical sweeping control circuit being connected to said signal detecting circuit for receiving an information about existence of the recognition signal from said signal detecting circuit and subsequent control operations of said vertical sweeping circuit so that the vertical sweeping speed is reduced and the vertical sweeping time is extended only when the recognition signal was detected by said signal detecting circuit.

4. The system as claimed in claim 2, wherein said recognition signal is superimposed on a horizontal retracing line period so that said signal detecting and scanning control section may control a sweeping speed and a sweeping time in the horizontal direction to reduce the sweeping speed and to extend the sweeping time.

5. The system as claimed in claim 4, wherein said display device comprises:

a screen with a cathode ray tube;

a vertical sweeping circuit being connected to said screen for conducting a sweeping in the vertical direction;

a horizontal sweeping circuit being connected to said screen for conducting a sweeping in the horizontal direction;

a signal detecting circuit being connected to an input terminal for receipt of any signals and subsequent detection of any recognition signal; and a horizontal sweeping control circuit being connected to said signal detecting circuit for receiving an information about existence of the recognition signal from said signal detecting circuit and subsequent control operations of said horizontal sweeping circuit so that the horizontal sweeping speed is reduced and the horizontal sweeping time is extended only when the recognition signal was detected by said signal detecting circuit.

6. An image sensing and displaying system comprising:

an image camera being provided with a signal superimposing unit for superimposing a recognition signal at a predetermined portion on any of time periods, except for all scanning periods including all image signals, said recognition signal indicating any kind of said image camera; and a display device being connected to said image camera and further being provided with a signal detecting and sweeping control section for detecting any recognition signal to control a sweeping speed and a sweeping time of an electron beam sweeping on a screen of said display device at least in any one of vertical and horizontal directions thereby the image is displayed entirely on said screen without any distortion thereof, wherein said screen of said display device is for a high definition television system and said image camera further comprises a solid state image sensor from which said recognition signal indicating squared pixels is superimposed at a predetermined portion in a retracing line period before the scanning period including all image signals, wherein said display device comprises:

a screen with a cathode ray tube;

a vertical sweeping circuit being connected to said screen for conducting a sweeping in the vertical direction;

a horizontal sweeping circuit being connected to said screen for conducting a sweeping in the horizontal direction;

a signal detecting circuit being connected to an input terminal for receipt of any signals and subsequent detection of any recognition signal; and a vertical sweeping control circuit being connected to said signal detecting circuit for receiving an information about existence of the recognition signal from said signal detecting circuit and subsequent control operations of said vertical sweeping circuit so that the vertical sweeping speed is reduced and the vertical sweeping time is extended only when the recognition signal was detected by said signal detecting circuit.

7. An image sensing and displaying system comprising:

an image camera being provided with a signal superimposing unit for superimposing a recognition signal at a predetermined portion on any of time periods, except for all scanning periods including all image signals, said recognition signal indicating any kind of said image camera; and a display device being connected to said image camera and further being provided with a signal detecting and sweeping control section for detecting any recognition signal to control a sweeping speed and a sweeping time of an electron beam sweeping on a screen of said display device at least in any one of vertical and horizontal directions thereby the image is displayed entirely on said screen without any distortion thereof, wherein said screen of said display device is for a high definition television system and said image camera further comprises a solid state image sensor from which said recognition signal indicating squared pixels is superimposed at a predetermined portion in a retracing line period before the scanning period including all image signals, wherein said recognition signal is superimposed on a horizontal retracing line period so that said signal detecting and scanning control section may control a sweeping speed and a sweeping time in the horizontal direction to reduce the sweeping speed and to extend the sweeping time.

8. The system as claimed in claim 7, wherein said display device comprises:

a screen with a cathode ray tube;

a vertical sweeping circuit being connected to said screen for conducting a sweeping in the vertical direction;

a horizontal sweeping circuit being connected to said screen for conducting a sweeping in the horizontal direction;

a signal detecting circuit being connected to an input terminal for receipt of any signals and subsequent detection of any recognition signal; and a horizontal sweeping control circuit being connected to said signal detecting circuit for receiving an information about existence of the recognition signal from said signal detecting circuit and subsequent control operations of said horizontal sweeping circuit so that the horizontal sweeping speed is reduced and the horizontal sweeping time is extended only when the recognition signal was detected by said signal detecting circuit.

* * * * *